Patented Sept. 5, 1922.

1,428,272

UNITED STATES PATENT OFFICE.

WILLIAM A. COLLINGS, OF KANSAS CITY, MISSOURI.

COATING COMPOSITION AND PROCESS OF PRODUCING THE SAME.

No Drawing.    Application filed November 5, 1921.  Serial No. 513,017.

*To all whom it may concern:*

Be it known that I, WILLIAM A. COLLINGS, a citizen of the United States, residing at Kansas City, in the county of Jackson and State of Missouri, have invented certain new and useful Improvements in Coating Compositions and Processes of Producing the Same, of which the following is a specification.

This invention relates to coating compositions and processes of producing the same; and it comprises as a new protective material for weatherproofing, rustproofing and waterproofing a coating composition containing linseed oil, or its equivalent, colloided or jellied by incorporating substantial proportions of colloiding agent therewith, advantageously a soapy material of the character of the insoluble metallic soaps, and further containing intimately incorporated, finely divided Portland cement or the like; and it also comprises a method of making such a composition wherein linseed oil is first jellied by incorporating a colloiding agent, such as a soapy material of the type of aluminum stearate thereinto, the jelly ripened by standing for a time and converted into a pasty mass of more or less complex colloid nature by incorporating finely divided Portland cement, or the like, and the paste being thereafter thinned with any of the usual thinners to such a consistency as may be desired; all as more fully hereinafter set forth and as claimed.

Ordinarily, iron and steel are protected by paints containing linseed oil as a vehicle and some pigmentary material, such as white lead, red lead, etc., as a filler. Frequently, asphaltic materials thinned with suitable solvents are used as vehicles. The protection offered by these coatings is by no means absolute and they must be renewed from time to time, being perishable. The coatings are more or less open textured and porous or spongy in nature; the linseed oil paints because of their slow oxidation and the asphaltic paints also because of the evaporation of the solvent causing a contraction in volume. Their rate of expansion and contraction as the temperature changes is, further, not the same as that of the underlying metal, so that they tend to fissure and peel more or less. Such paints are open to the penetration of moisture to the metal, apart from the further consider- able solubility or absorption of moisture in the coating film itself. In situations where temperature changes are of such character as to cause sweating, corrosion frequently becomes quite rapid with the best of these paints. Salt air by the seaside, sulfur fumes in smoke, etc., gain access to the underlying metal. Under such circumstances white lead paints are often found to disintegrate to a dusty powder while zinc oxid paints crack and peel.

In the present invention I have devised a coating material on different principles and of a different character. I use linseed oil, or other paint oil as a vehicle but I first colloid the oil by dissolving or dispersing therein a substantial proportion of an agent capable of being dissolved or dispersed therein to form a gelatinous or jellied mass, such as a soapy material of a character normally insoluble in water, such as water-insoluble stearates, palmitates, oleates, resinates, etc. By colloiding the oil with the soapy material a gel is formed which takes up finely divided mineral powders (and particularly cement) in a new and advantageous way, the relation of the powder and the oil being different from that obtaining in ordinary linseed oil paints. Further, apart from this, the texture of the vehicle film itself is rendered denser and less receptive to moisture. Advantageously, the metal soap employed in aluminum stearate or some other aluminum soap, though soaps of other metals such as calcium, magnesium, barium, etc., may be used. Because of their indifference and non-ironizing character, aluminum soaps are, on the whole, the best for my purposes. Stearate of aluminum dissolves in, or, rather, forms a colloidal sol with, linseed oil, giving a material of a character particularly advantageous for my present purposes. Usually I stir the dry aluminum stearate into the oil rather hot, say, 105° to 120° C. Heating and stirring are regulated so that the mass finally takes on a clear but viscous and jelly-like consistency. Ordinarily, I employ raw linseed oil in making this jelly. Incorporation is usually complete after about 30 minutes stirring. After the jelly consistency is attained, I allow the colloided oil to stand for a time, to cause the emulsion or sol to ripen and age. About 24 hours standing usually suffices. After the gel has ripened in this way, it is once more thoroughly stirred and is now ready for the further steps of my process. Into the gel I next incorporate several times its weight of very fine Portland cement or analogous calcareous, cementitious material. Advantageously a fineness such that practically all the cement passes a 200-mesh sieve is desirable. Commercial cements may be obtained of this fineness; and where 95 per cent will pass a 200-mesh sieve the bulk of the material is very much finer than 200 mesh; it is of such fineness as to approach the minute dimensions required for forming colloid suspensions. The operation so far described produces a composition of a pasty composition, keeping indefinitely and ready at any time to be thinned down to paint consistency. Raw linseed oil which dries but slowly forms a more stable, and therefore more desirable paste than boiled oil or oils containing added driers. If driers be deemed desirable, they can be added later together with diluting oils in thinning. In practice I use relatively large amounts of cement in making this paste and for keeping purposes a heavy, pasty consistency is desirable in maintaining this cement in suspension without stratification. For use in coating the paste may be thinned somewhat with more linseed oil, either raw or boiled; and it may also have pigments of the usual kinds incorporated. My pasty material is a paint basis which may be employed in many ways in making protective paints.

In lieu of linseed oil, I may employ various other drying and semi-drying oils, such as tung oil (China wood oil), blown fish oils, cottonseed oils, etc. But I regard raw linseed oil as the best material for forming my colloided pasty paint basis. In this pasty composition, the aluminum stearate and linseed oil together form a gel or colloidal system; and in this gel, the fine Portland cement is incorporated as a solid phase of a compound colloidal system. In use on iron and steel structures, the linseed oil thus colloided forms a thick and impervious film having but little power of absorbing or adsorbing moisture and but little tendency to become open textured or fissured. With the suspension of cement particles, the material is given a rate of expansion and contraction sufficiently close to that of iron and steel to allow the film to follow the metal and prevent fissuring and rupturing in use. Any moisture penetrating, or absorbed by, the film is taken up by the cement particles with the result of producing a further densification of the film and formation of a true hydraulic paint. Whether any union, adsorptive or chemical, takes place between the linseed oil and the cement particles, in the first or the final setting may remain undecided, although from the properties of the final aged film I am of the opinion that such an action occurs. With age my new protective coating becomes continually denser and more impervious to weather and corrosive agencies.

While I have particularly described aluminum stearate, other aluminum soaps such as oleates, palmitates, resinates, naphthenates, etc., may be used in its lieu or mixtures of these soaps. Similar soaps containing lime, magnesia or baryta may be used instead of the aluminum compounds.

In a specific embodiment of the present invention, I may take raw linseed oil and stir thereinto about 4 to 6 per cent of commercial aluminum stearate. This stearate is an extremely fine light powder, of quite bulky character; and careful stirring is necessary in securing uniform incorporation. Any commercial type of stirring or blending apparatus may be used. The oil should be at a temperature of, say, 105° to 120° C. during incorporation. Incorporation may be at lower temperatures or even in the cold, but much more time is then required. With any particular commercial stearate, there is usually found a special temperature at which incorporation is quick and ready. The temperature and conditions are right when the aluminum stearate is taken up quickly by the oil, the white powder disappearing and the mass taking on a clear but viscous, jelly consistency. When this consistency is attained, the gel-formation or colloiding of the oil and stearate may be considered complete. Usually, it takes about 30 minutes to complete the incorporation. It is best not to exceed a temperature of 120° C. The jelly is then allowed to cool and ripen for 24 hours, when it is again thoroughly stirred. To the ripened jelly I next add about 5 times its weight of a good commercial fine-ground Portland cement with 95 per cent passing a 200 mesh sieve. The jelly and cement are thoroughly mixed and worked in a paint mixer or the like until the mass becomes a sticky paste of about putty consistency. The proportion of cement directed above gives good results for paints intended to protect iron and steel. For other purposes, the proportion may be increased or diminished. To make a protective paint, this paste is thinned down with enough raw or boiled linseed oil to give it the usual paint consistency. The paint so produced, when applied to iron or steel in time absorbs, or adsorbs, a certain amount of moisture which is taken up by the cement, forming a thick rigid coat with little tendency to fissure.

In lieu of Portland cement, other kiln-made cements of like character, such as iron cement, slag cement, etc., may be employed or there may be used the natural cements, such as Rosendale cement or the like. I find, however, that the cements of the type of Portland cement are much more desirable than those of the type of natural cement.

In order to obtain the full value of the present material it is necessary to have in the pasty composition enough cement so that in using the final paint a coating film or layer is obtained in which there is sufficient cement to cover completely the surface of the iron or steel to be protected.

In the paint produced with the stated composition on metal there are, so to speak, two sets; firstly that due to the jellied oil and, secondly, that due to the incorporated cement. The latter is the more important; and it is possible to use oils of less pronounced setting character than linseed oil; it being even possible under the present invention to produce good and useful products with oils which, like viscous petroleum or asphalt products, do not properly set at all. Vegetable and animal oils of much less pronounced setting or drying character than linseed oil can be used for the present purpose. Cotton seed oil, for example, may be employed.

As to the exact nature of the actions, chemical or physical, occurring in the described process, I am not certain and I content myself with describing the operations and the results produced without in any way limiting myself to any theory of action. But in this connection I may note that in the matter of making a dense impervious cement paint with the aid of linseed oil, etc., any jellifying addition to the vehicle oil, converting it from a homogeneous liquid to a jelly-like mass, produces my results in a greater or less measure, but in practice, I have found that linseed oil or another oil jellied by aluminum stearate gives exceptionally good results.

While the described composition is primarily intended as a protective paint coating for metals, and particularly iron and steel, yet it may of course be used for general painting purposes, wherever a hard, dense and impervious coating is required.

What I claim is:—

1. A material for protective paints comprising an oil jellied by incorporated water insoluble soap.

2. A material for protective paints comprising an oil jellied by incorporated aluminum soap.

3. A material for protective paints comprising a drying oil jellied by incorporated aluminum stearate.

4. A material for protective paints comprising an oil jellied by incorporated water insoluble soap and containing incorporated fine cement.

5. A material for protective paints comprising cement incorporated into a jellied oil.

6. A material for protective paints comprising cement incorporated into jellied linseed oil.

7. A material for protective paints comprising an oil jellied by incorporated aluminum soap and containing incorporated fine cement.

8. A material for protective paints comprising a drying oil jellied by incorporated aluminum stearate and containing incorporated fine cement.

9. A paint material comprising a jelly of drying oil and aluminum soap admixed with fine cement of the character of Portland cement.

10. The process of making protective coating materials which comprises jellying a drying oil by incorporation thereinto while hot of an aluminum soap and admixing Portland cement.

11. The process of making protective coating materials which comprises jellying hot raw linseed oil by incorporating aluminum stearate, aging the jelly and admixing Portland cement with the jelly in sufficient proportion to make a stiff paste.

12. The process of making protective coatings which comprises jellying an oil and admixing fine cement with the oil jelly in amount sufficient to make a pasty mass.

13. The process of making protective coatings which comprises jellying linseed oil and admixing fine cement with the oil jelly in amount sufficient to make a pasty mass.

14. The process of making a cement paint which comprises adding a colloiding material to a paint vehicle and incorporating fine cement therewith.

In testimony whereof, I have hereunto affixed my signature.

WILLIAM A. COLLINGS.